June 7, 1960

K. W. HARRISON 2,939,917

MODULATING ARRANGEMENTS FOR CARRIER
WAVE TELEPHONE OR LIKE SYSTEMS

Filed June 25, 1954

4 Sheets-Sheet 1

INVENTOR
KENNETH W. HARRISON.
BY Young, Emery & Thompson
ATTORNEYS.

INVENTOR

KENNETH WHITELEY HARRISON

BY Irwin S. Thompson

ATTY.

INVENTOR
KENNETH WHITELEY HARRISON
BY Irwin S. Thompson
ATTY.

June 7, 1960 K. W. HARRISON 2,939,917

MODULATING ARRANGEMENTS FOR CARRIER WAVE TELEPHONE OR LIKE SYSTEMS

Filed June 25, 1954

4 Sheets-Sheet 4

INVENTOR

KENNETH WHITELEY HARRISON

By Irvin S. Thompson

ATTY.

United States Patent Office 2,939,917

Patented June 7, 1960

2,939,917

MODULATING ARRANGEMENTS FOR CARRIER WAVE TELEPHONE OR LIKE SYSTEMS

Kenneth Whiteley Harrison, Orpington, Kent, England, assignor to Telephone Manufacturing Company Limited, London, England, a British company Filed June 25, 1954, Ser. No. 439,355

Claims priority, application Great Britain June 30, 1953

7 Claims. (Cl. 179—15)

The invention relates to carrier wave telephone and the like systems and more particularly to methods of modulation and to modulating arrangements for obtaining the necessary operating and modulating frequencies.

The invention is applicable particularly to systems wherein it is necessary repeatedly to translate a frequency band to a higher or a lower position in the frequency spectrum whilst keeping the frequency error, which is liable to be suffered during translation, within the desired limits.

One example of such a system is a multi-channel carrier wave telephone or like system employing frequency frogging at the repeaters. Frequency frogging may be described as the use of group modulation at successive repeaters alternately to transpose the frequency bands such that at each repeater the low level inputs are always in one of the bands and the high level outputs in the other; thus at one repeater low frequency input bands are translated to higher frequency output bands and at the next repeater the operation is reversed. In addition to frequency frogging, it is preferable to invert the two frequency bands in passing through the repeater so that the highest frequency channel in one line section becomes the lowest frequency channel in the succeeding line section.

It is often highly desirable to be able to employ such methods, since they avoid the need for employing separate cables for the "go" and "return" circuits whilst maintaining substantial benefits, for example in respect of crosstalk levels and the equalisation of losses in the line sections. On the other hand such systems are dependent for their satisfactory operation upon a high degree of stability of the group carrier sources.

For example, the principal difficulty in applying frequency frogging to single sideband suppressed carrier systems is the provision, at each frequency frogging repeater, of a group carrier source sufficiently frequency stable so that the cumulative error in frequency translation introduced at the repeaters is kept to a minimum. In practice as many as fifty or more repeaters may be required to be operated in tandem, and to ensure an overall error in frequency translation of not more than $\pm 2$ c./s. (C.C.I.F. recommendation) would necessitate providing group oscillators at each repeater having frequency instabilities of not worse than the order of 1 part in $10^6$.

Oscillators having this degree of stability are expensive, and also difficult to maintain. It is therefore an object of this invention to provide, especially in systems where repeated alternate transpositions of frequency bands are carried out, a method of generating group carrier frequencies which is comparatively inexpensive and not subject to cumulative error.

A further object of the invention is to provide a stable source of group carrier frequency, comprising a small number of inexpensive components, at any desired number of different sections of a carrier wave system.

Broadly the invention relates to group frequency translation in which the group carrier is derived by a method of regenerative modulation employing pilot frequencies and employing the group modulator as part of the regenerative modulation system.

According to one aspect of the present invention, pilot frequencies associated with the input and output bands of a group modulator are employed in a regenerative modulation system to provide the carrier source for said group modulator.

According to another aspect of the present invention a method of providing a stabilized group carrier frequency for a group modulator consists in regeneratively modulating a pilot frequency derived from an input band with a second frequency derived from an output band, and supplying a frequency, which is derived from said regenerative modulation, to said group modulator.

According to a further aspect of the invention, in a frequency frogging system, input and output pilot frequencies occupying appropriate positions in or with respect to the input and output bands of a group modulator are selected and are employed in a regenerative modulation system, which includes said group modulator, to produce the group carrier frequency for said group modulator.

By suitable choice of said input and output pilot frequencies to be used in the regenerative modulator and by including said group modulator in the regenerative modulator circuit, a substantial simplification of the regenerative modulator circuit is achieved; specifically a reduction in the number of multiplication or division stages is obtained as compared with the case where a separate regenerative modulator, not including said group modulator, is employed.

Preferably, by suitable selection of the pilot frequencies, the requirements of the regenerative modulation circuit are reduced to only one multiplication stage, and division stages may be entirely eliminated. Besides satisfying the requirements for regenerative modulation using a minimum of multiplication stages, the pilot frequencies may have such positions in the group spectra as to facilitate their use for automatic gain regulation.

The invention will now be further described with reference to the accompanying diagrammatic drawings.

Figure 1:
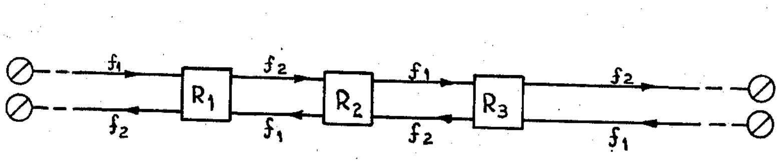
Fig. 1 is a diagram intended to illustrate frequency frogging.

Referring now to the drawings, Fig. 1 represents part of a frequency frogged cable carrier system between two terminals (not shown). $f_1$ and $f_2$ represent lower and upper frequency bands, for example of 12–60 kc./s. and 68–116 kc./s., each comprising eight channels of 6 kc./s. carrier spacing. Group modulation is effected at successive repeaters $R_1$, $R_2$ and $R_3$ to transpose the frequency bands so that at repeater $R_1$ both inputs are in the $f_1$ band, and both outputs are in the $f_2$ band. The same condition appears at repeater $R_3$ and the reversed condition at $R_2$. In addition to frogging, the groups of channels are inverted in passing through the repeater in known manner so that the highest channel frequency in one line section becomes the lowest channel frequency in the succeeding line section.

Figure 2:
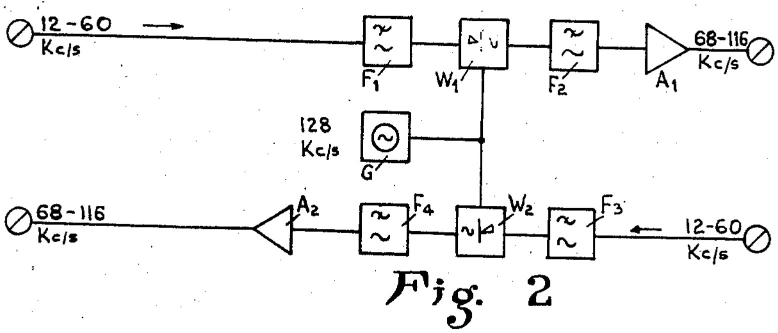
Figs. 2 and 3 are simplified block schematic diagrams indicating the known process of frequency frogging at two successive repeaters, say $R_1$ and $R_2$ of Fig. 1.

Fig. 2 shows the arrangement at $R_1$ where the lower band of 12–60 kc./s. comprising upper side-bands of carriers of 12, 18, 24 . . . 54 kc./s. passes through filter $F_1$ to the group modulator $W_1$, supplied with a carrier of 128 kc./s. from an oscillator G. The resulting lower side-bands in the range 68–116 kc./s. are selected by filter $F_2$ and amplified at $A_1$. A similar process is carried out for the incoming band of 12–60 kc./s. in the opposite direction by filter $F_3$, group modulator $W_2$, filter $F_4$ and amplifier $A_2$.

Figure 3:
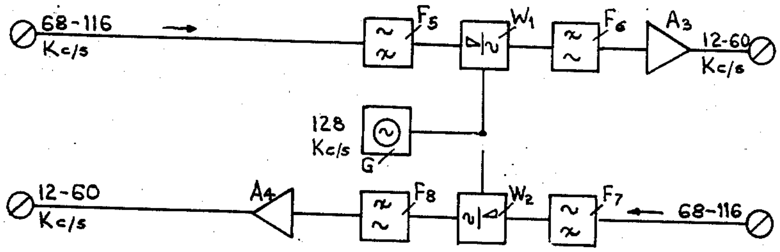

Fig. 3 shows in an analogous manner the input and output conditions at a second repeater say $R_2$, where the reverse translation process is carried out, the group carrier being the same and the group modulators being similarly indicated, and the filters being indicated by $F_5$, $F_6$, $F_7$, $F_8$ respectively and the amplifiers by $A_3$ and $A_4$.

Figure 4:
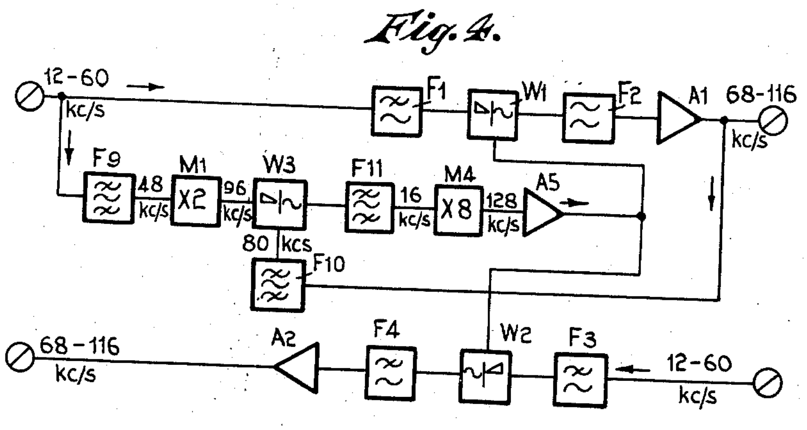
Figs. 4 and 5 are simplified block schematic diagrams illustrating the application of the method of the invention as carried out at two successive repeaters and taking a typical numerical example of the frequencies employed.
Figure 5:
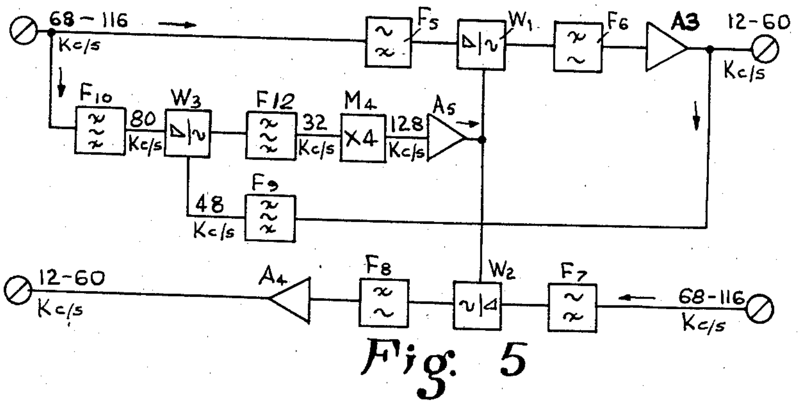

Figs. 4 and 5 show schematically how according to one particular form of the invention the group carrier can be derived by a process of regenerative modulation from a pilot frequency received from the line. In this particular example the pilot is chosen for convenience to be a channel carrier of 48 kc./s., which after frequency frogging is retransmitted as a frequency of 80 kc./s.

In Figs. 4 and 5, the components corresponding to those in Figs. 2 and 3 are indicated by similar references. In Fig. 4 the pilot frequency of 48 kc./s. is taken from the input frequency band of 12–60 kc./s. by band-pass filter $F_9$, multiplied by 2 in the multiplier $M_1$ and fed to a modulator $W_3$. A pilot frequency is also taken from the output frequency band by filter $F_{10}$. This second pilot frequency is interdependent on the choice of the first pilot frequency, and on the spacing between the input and output bands, which, in the present case is 8 kc./s., and on the group carrier frequency, as will be further explained below. Filter $F_{10}$ passes the frequency of 80 kc./s. which is fed also to the modulator $W_3$. The lower side-band output of $W_3$ is 16 kc./s. which is then multiplied by 8 in the multiplier $M_4$ and supplied by way of amplifier $A_5$ to the frogging frequency modulators $W_1$ and $W_2$ as a group carrier of 128 kc./s.

The circuit above described, including the group modulator $W_1$, comprises a regenerative modulator which maintains stability of the group carrier of 128 kc./s. and of the frequency of 80 kc./s., which is transmitted in the output band as a pilot frequency for the next repeater. The conditions obtaining there are shown in Fig. 5, where the corresponding components are similarly referenced to Fig. 3, and the group carrier is again derived by a similar method of regenerative modulation, the 80 kc./s. pilot being taken from the input band and the 48 kc./s. pilot from the output band. In this case however the multiplier $M_1$ is not used and the multiplier $M_4$ which is supplied through filter $F_{12}$ with a frequency of 32 kc./s. is arranged to multiply by 4.

Figure 6:
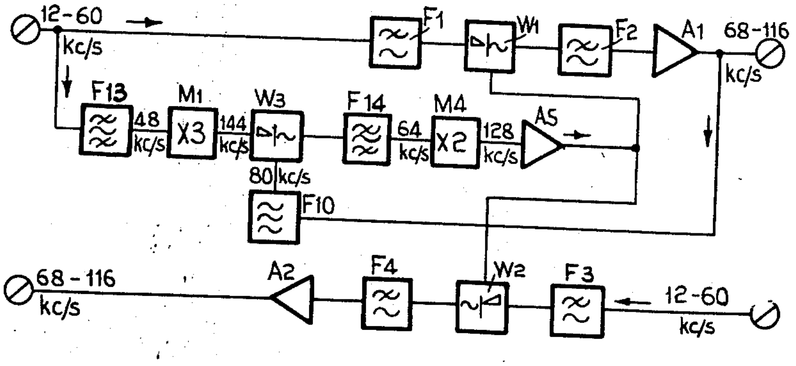
Fig. 6 shows a possible alternative to the Fig. 4 arrangement using the same frequency values.

Fig. 6 shows a modification of the Fig. 4 arrangement in which the same result in achieved by a slightly different choice of frequencies. In this case the multiplier $M_1$ is arranged to multiply by 3 giving a frequency of 144 kc./s. which is supplied to the modulator $W_3$. A frequency of 64 kc./s. is obtained from the output by means of the bandpass filter $F_{14}$ and this frequency is multiplied by 2 in the multiplier $M_4$ to give the desired group carrier of 128 kc./s.

In this example the pilot frequencies are so chosen that their positions in the group spectra correspond to the mid-point of the total band width of the group, thus facilitating the use of these pilot frequencies for automatic gain regulation.

However with the examples of "go" and "return" frequencies given above it might be desirable in order to ease the selectivity problem to choose pilot frequencies at the edge of the transmitted bands of 60 and 68 kc./s. respectively. In this case the circuit arrangement could be as shown in Figs. 7 and 8 for adjacent repeaters with Fig. 9 as a possible alternative to Fig. 7.

Figure 7:
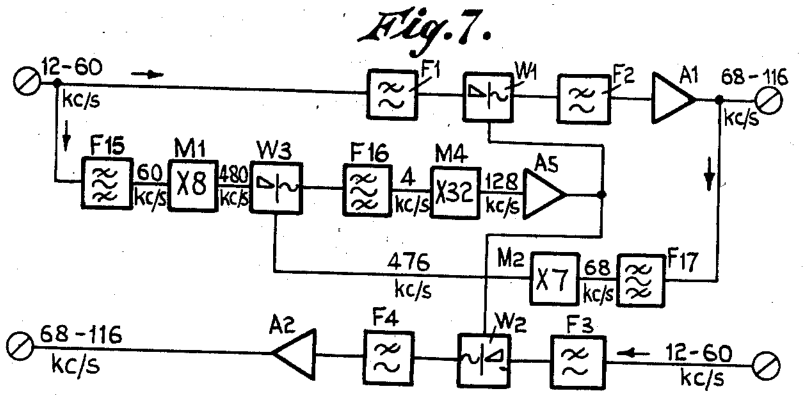
Figs. 7, 8 and 9 illustrate three alternative possibilities for a different numerical example, in which the pilot frequencies are taken at the edges of the input and output bands.

In the Fig. 7 arrangement, the input pilot frequency of 60 kc./s. is selected by the filter $F_{15}$ and fed to the modulator $W_3$ by way of multiplier $M_1$ which is arranged to effect multiplication by 8, thus giving a frequency of 480 kc./s. An output pilot frequency of 68 kc./s., selected by filter $F_{17}$, is also fed to the modulator $W_3$ by way of the multiplier $M_2$ which produces multiplication by 7 to give a frequency of 476 kc./s. The modulator lower side-band output of 4 kc./s. is selected by filter $F_{16}$, multiplied by 32 in multiplier $M_4$ and amplified at $A_5$ before being supplied to the group modulators $W_1$ and $W_2$.

Figure 8:
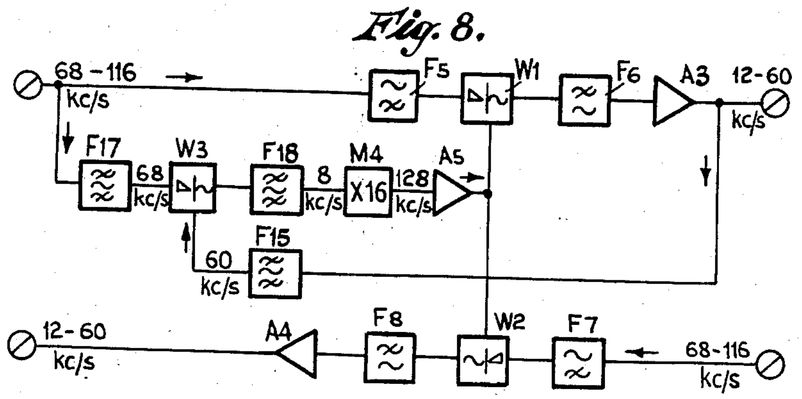

Similarly, in the circuit of Fig. 8 which would apply to the adjacent repeater station, the input pilot frequency of 68 kc./s. is selected by the filter $F_{17}$ and fed to the modulator $W_3$. The output pilot frequency of 60 kc./s. is selected by filter $F_{15}$ and also fed to the modulator $W_3$. The lower side-band i.e. 8 kc./s. of the output from this modulator is selected by the filter $F_{18}$ and is then passed to the multiplier $M_4$ which produces multiplication by 16, thus giving the required group carrier frequency of 128 kc./s.

Figure 9:
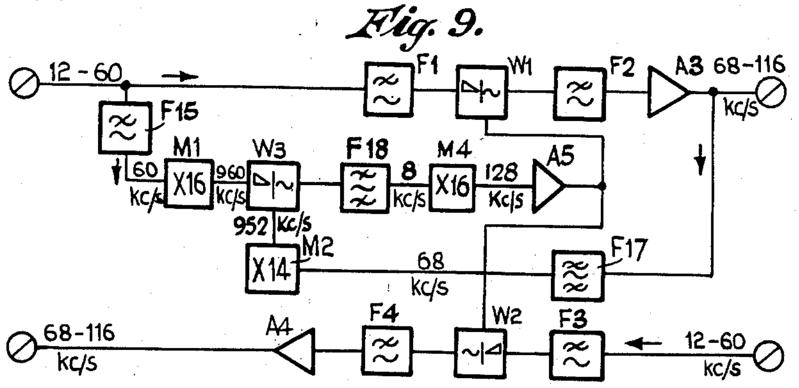

The arrangement of Fig. 9, which is alternative to Fig. 7, only differs therefrom in that the multipliers $M_1$ and $M_2$ give twice the factor of multiplication of the corresponding multipliers in Fig. 7, so that the lower side-band output from the modulator $W_3$ is 8 kc./s. as selected by the filter $F_{18}$ and consequently the multiplier $M_4$ need only have a multiplication factor of 16 to give the desired value of 128 kc./s.

Figure 10:
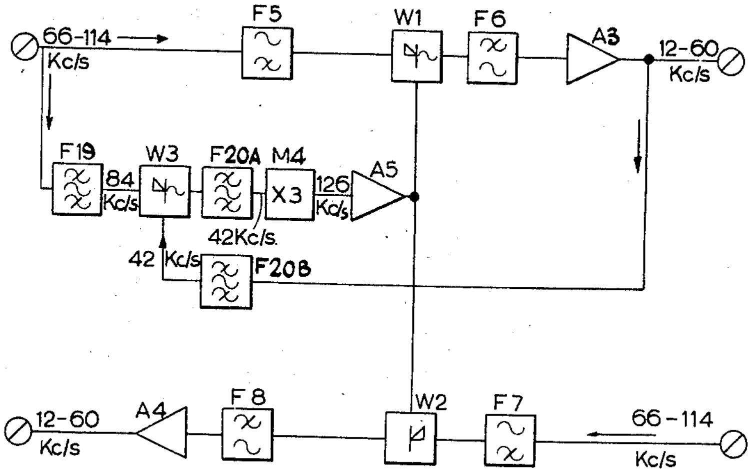
Fig. 10 shows a modification using 126 kc./s. as the group carrier frequency instead of 128 kc./s.

In the above examples of a system using upper and lower groups of eight channels with the carriers spaced at 6 kc. intervals, it is assumed that a group carrier frequency of 128 kc./s. is required in order to provide a spacing of 8 kc./s. between the upper and lower eight-channel groups. However, the optimum group frequency for this example would be 126 kc./s., that is a spacing of 6 kc./s. between upper and lower groups, since the group carrier could then be generated in the low-to-high frequency direction of transmission simply by selecting the incoming 42 kc./s. pilot and multiplying by 3. In the high-to-low frequency direction of transmission the group carrier of 126 kc./s. could be generated by selecting pilots of 84 kc./s. at the input and 42 kc./s. at the output, applying these pilots to a second modulator, selecting the lower side band output of 42 kc./s. and then multiplying by 3. This is indicated in Fig. 10 where the 84 kc./s. pilot frequency is selected by the bandpass filter $F_{19}$ and applied to the modulator $W_3$. The output pilot frequency of 42 kc./s. is also applied to the modulator $W_3$ after selection by the filter $F_{20}$B and the modulator lower side-band output is selected by the filter $F_{20}$A and multiplied by 3 in the multiplier $M_4$.

In general the optimum arrangement for any system is that where in one direction of transmission the group carrier frequency may be obtained as a simple multiple of the incoming pilot frequency. In all such cases regenerative modulation is then required only at alternate frogging repeaters and the bulk and complexity of the equipment is thereby reduced.

It might seem at first sight that since, in the above described examples, the sum of the pilot frequencies is always equal to the group carrier frequency, a modulator producing a simple addition would be adequate. It will, however, be appreciated by those skilled in the art that such a system would not constitute regenerative modulation and would therefore not be frequency stable.

Other modifications may be devised whilst retaining the benefits of the invention. For example the invention may also be applied to systems employing twelve carrier channels of 4 kc./s. spacing. Also it might be desirable to use the regeneratively modulated group carrier to lock a local oscillator which in turn would supply carrier power to the frogging modulator. The advantage of this arrangement would be that in the event of a failure of the transmitted pilot the system would continue to operate although the accuracy of the frequency translation would be reduced.

I claim:

1. In a multiplex carrier wave communication system including a repeater provided with an input and an output and having a modulator for effecting group modulation of a group of channels, means in said repeater for generating the group modulating frequency comprising means for selecting a first pilot frequency from carrier waves applied to the input to said repeater, means for selecting a second pilot frequency from the group-modulated carrier waves at the output of said repeater, means for intermodulating said first and second pilot frequencies and means for selecting a product of said intermodulation and supplying it to said group modulator as the group modulating frequency.

2. In a multiplex carrier wave communication system including a repeater provided with an input and an output and having a first modulator for effecting the group modulation of incoming carrier waves representing a group of channels, means in said repeater for generating the group modulating frequency comprising first filter means for selecting a first pilot frequency from carrier waves applied to the input of said first modulator, second filter means for selecting a second pilot frequency from the group-modulated carrier waves at the output of said repeater, a second modulator to which said first and second pilot frequencies are fed, third filter means for selecting a desired frequency from the output of said second modulator and a multiplier for producing a harmonic of said desired frequency to provide the group modulating frequency.

3. In a multiplex carrier wave communication system a repeater provided with an input and an output and by means of which incoming carrier waves representing a group of channels are amplified and group modulated before re-transmission, comprising a first modulator for group-modulating said incoming carrier waves, a first filter for selecting the lower side band from the products of said modulator, an amplifier for amplifying said lower side band, a second filter for selecting a first pilot frequency from said incoming carrier waves, a third filter for selecting from the output of said amplifier a second pilot frequency produced by the modulation of said first pilot frequency by said first modulator, a second modulator to which said first and second pilot frequencies are fed, a fourth filter for selecting a desired frequency from the output of said second modulator, and a multiplier for producing a harmonic of said desired frequency to provide the group modulating frequency for said first modulator.

4. In a multiplex carrier wave communication system a repeater provided with an input and an output and by means of which incoming carrier waves representing a group of channels are amplified and group modulated before re-transmission comprising a first modulator for group-modulating said incoming carrier waves, a first filter for selecting the lower side band from the products of said modulator, an amplifier for amplifying said lower side band, a second filter for selecting a first pilot frequency from said incoming carrier waves, a first multiplier for producing a harmonic of said first pilot frequency, a third filter for selecting from the output of said amplifier a second pilot frequency produced by the modulation of said first pilot frequency by said first modulator, a second modulator to which said harmonic of said first pilot frequency and said second pilot frequency are fed, a fourth filter for selecting a desired frequency from the output of said second modulator, and a second multiplier for producing a harmonic of said desired frequency to provide the group modulating frequency for said first modulator.

5. In a multiplex carrier wave communication system a repeater provided with an input and an output and by means of which incoming carrier waves representing a group of channels are amplified and group modulated before re-transmission comprising a first modulator for group-modulating said incoming carrier waves, a first filter for selecting the lower side band from the products of said modulator, an amplifier for amplifying said lower side band, a second filter for selecting a first pilot frequency from said incoming carrier waves, a first multiplier for producing a harmonic of said first pilot frequency, a third filter for selecting from the output of said amplifier a second pilot frequency produced by the modulation of said first pilot frequency by said first modulator, a second multiplier for producing a harmonic of said second pilot frequency, a second modulator to which said harmonics of said first and second pilot frequencies are fed, a fourth filter for selecting a desired frequency from the output of said second modulator, and a third multiplier for producing a harmonic of said desired frequency to provide the group modulating frequency for said first modulator.

6. In a multiplex carrier wave communication system including Go and Return paths for a group of channels, a first modulator for effecting group modulation of the channels in the Go path and having an input and an output, a second modulator for effecting group modulation of the channels in the Return path, means for selecting a first pilot frequency from carrier waves applied to the input to said first modulator, means for selecting a second pilot frequency from the group modulated carrier waves at the output of said first modulator, means for intermodulating said first and second pilot frequencies and means for supplying a product of said intermodulation to both said first and said second modulators as the group modulating frequency.

7. In a multiplex carrier wave communication system including a plurality of repeater stations and providing Go and Return paths for a group of channels, equipment in a first repeater station comprising a first modulator for effecting group modulation of the channels in the Go path and having an input and an output, a second modulator for effecting group modulation of the channels in the Return path, means for selecting a first pilot frequency from carrier waves applied to the input to said first modulator, means for selecting a second pilot frequency from the group modulated carrier waves at the output of said first modulator, means for intermodulating said first and second pilot frequencies and means for supplying a product of said intermodulation comprising a harmonic of said second pilot frequency to both said first and said second modulators as the group modulation frequency; in combination with equipment at an adjacent repeater station comprising a third modulator for effecting group modulation of the channels in the Go path and having an input and an output, a fourth modulator for effecting group modulation of the channels in the Return path, means for selecting said second pilot frequency from carrier waves applied to the input to said third modulator and means for producing the said harmonic of said second pilot frequency to provide the group modulating frequency for said third and fourth modulators.

References Cited in the file of this patent

UNITED STATES PATENTS

| | | |
|---|---|---|
| 1,690,299 | Horton | Nov. 6, 1928 |
| 2,695,332 | Caruthers | Nov. 23, 1954 |

FOREIGN PATENTS

| | | |
|---|---|---|
| 548,910 | Germany | Apr. 21, 1932 |